United States Patent
Noie et al.

(10) Patent No.: US 8,618,763 B2
(45) Date of Patent: *Dec. 31, 2013

(54) MOTOR DRIVE CIRCUIT

(75) Inventors: Joji Noie, Ota (JP); Toshiyuki Imai, Ora-gun (JP); Takahiro Iida, Ora-gun (JP); Tetsuya Yoshitomi, Ora-gun (JP)

(73) Assignees: SANYO Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/690,993

(22) Filed: Jan. 21, 2010

(65) Prior Publication Data

US 2010/0181951 A1    Jul. 22, 2010

(30) Foreign Application Priority Data

Jan. 22, 2009   (JP) ................................ 2009-012227

(51) Int. Cl.
*G05B 11/28*    (2006.01)

(52) U.S. Cl.
USPC .......................................... 318/599; 318/811

(58) Field of Classification Search
USPC ................... 318/599, 811; 388/800, 811, 819
See application file for complete search history.

(56) References Cited

U.S. PATENT DOCUMENTS

| | | | |
|---|---|---|---|
| 3,855,520 A | 12/1974 | Stich | |
| 4,587,467 A | 5/1986 | Breiner | |
| 4,763,347 A * | 8/1988 | Erdman | ................... 318/400.22 |

(Continued)

FOREIGN PATENT DOCUMENTS

| | | |
|---|---|---|
| EP | 2 077 611 | 7/2009 |
| JP | 61-62389 | 3/1986 |

(Continued)

OTHER PUBLICATIONS

Imai et al., U.S. Office Action mailed Dec. 3, 2009, directed to U.S. Appl. No. 12/252,289; 9 pages.

(Continued)

*Primary Examiner* — Rina Duda
(74) *Attorney, Agent, or Firm* — Morrison & Foerster LLP

(57) ABSTRACT

The invention provides a motor with a low speed start function and a soft start function. The motor includes a first pulse generation circuit generating a first pulse signal of which a first duty ratio of one of logic levels is increased as a drive voltage corresponding the target rotation speed of the motor is increased, a second pulse generation circuit generating a second pulse signal of which a second duty ratio of one of logic levels is different from the first duty ratio, and a drive control circuit supplying a drive current to a motor coil at the second duty ratio in order to start the rotation of the motor that is stopping and supplying a drive current to the motor coil at the first duty ratio after a predetermined time passes from the start of the rotation of the motor in response to a rotation signal corresponding to the rotation of the motor.

4 Claims, 3 Drawing Sheets

(56) References Cited

U.S. PATENT DOCUMENTS

| | | | |
|---|---|---|---|
| 4,823,056 A | | 4/1989 | Watanabe et al. |
| 5,036,267 A | | 7/1991 | Markunas et al. |
| 5,557,184 A | * | 9/1996 | Hwang .................. 318/608 |
| 5,606,296 A | | 2/1997 | Seong |
| 6,201,414 B1 | | 3/2001 | Yazdy |
| 6,841,954 B2 | | 1/2005 | Nakabayashi |
| 7,271,993 B2 | * | 9/2007 | Plojhar et al. .................. 361/154 |
| 7,358,696 B2 | * | 4/2008 | Iwanaga et al. ............... 318/293 |
| 7,839,104 B2 | | 11/2010 | Imai et al. |
| 7,852,155 B2 | * | 12/2010 | Chaoui .................. 330/251 |
| 2009/0039820 A1 | * | 2/2009 | Milano et al. .................. 318/590 |
| 2009/0231052 A1 | * | 9/2009 | Li .................. 332/109 |
| 2010/0027979 A1 | * | 2/2010 | Matsunaga et al. ............ 388/811 |

FOREIGN PATENT DOCUMENTS

| | | |
|---|---|---|
| JP | 62-16088 | 1/1987 |
| JP | 5-228291 | 9/1993 |
| JP | 8-266086 | 10/1996 |
| JP | 9-65675 | 3/1997 |
| JP | 2006-174648 | 6/2006 |

OTHER PUBLICATIONS

Imai et al., U.S. Office Action mailed Apr. 29, 2010, directed to U.S. Appl. No. 12/252,289; 12 pages.

Li, C., U.S. Office Action mailed Jun. 30, 2009, directed to U.S. Appl. No. 12/047,881; 8 pages.

* cited by examiner

MOTOR DRIVE CIRCUIT

CROSS-REFERENCE OF THE INVENTION

This application claims priority from Japanese Patent Application No. 2009-012227, the content of which is incorporated herein by reference in its entirety.

BACKGROUND OF THE INVENTION

1. Field of the Invention

The invention relates to a motor drive circuit.

2. Description of the Related Art

A fan motor is used in a personal computer or home electronics in order to cool a heat generating component. When a heat generating component is cooled by the fan motor, the cooling performance is enhanced by increasing the rotation speed of the motor, but it is necessary to adjust the rotation speed of the motor appropriately corresponding to the amount of heat generation in order to minimize the power consumption or reduce the noise.

There is a PAM (Pulse Amplitude Modulation) control method as a type of motor rotation control method. In the PAM control method, the rotation speed of a motor is adjusted by increasing or decreasing a drive voltage applied to the motor coil corresponding to the amount of heat generation.

Furthermore, in order to enhance the minimization of the power consumption or the noise reduction, intermittent drive may be employed as well as the drive voltage control. For example, Japanese Patent Application Publication. No. 2006-174648 discloses a control method in which a drive voltage is decreased corresponding to the target rotation speed of a motor and a ratio of a drive voltage applied to the motor coil is decreased as the target rotation speed of the motor is decreased. This control method realizes a control such that a motor rotates at lower speed compared with a case of using the drive voltage adjustment only, thereby realizing the minimization of the power consumption or the noise reduction.

During the rotation of such a motor, a cogging torque occurs by attraction or repulsion corresponding to the positional relation of the magnetic poles and the motor coil. During the stop of the motor, the motor coil often rests on a position where the cogging torque becomes minimum. Therefore, in order to start the rotation of the motor that is stopping, a torque exceeding the maximum level of the cogging torque is necessary.

In the method disclosed in Japanese Patent Application Publication No. 2006-174648, when the rotation speed of the motor is decreased, the drive voltage is low and the driving ratio is also decreased, and thus the torque for driving the motor is also decreased. During the rotation of the motor, the rotation is kept by inertia even with a small torque. However, in order to start the rotation of the motor at low speed when the motor is stopping, the torque for driving the motor can not exceed the maximum level of the cogging torque, resulting in a failure of start at low speed. In particular, a single-phase motor has a larger difference between the maximum level and the minimum level of the cogging torque, compared with a three-phase motor, starting at low speed is more difficult.

SUMMARY OF THE INVENTION

The invention provides a motor drive circuit that includes a drive voltage generation circuit generating a drive voltage corresponding to a target rotation speed of a motor and a first pulse generation circuit generating a first pulse signal having a first logic level and a second logic level. The duty ratio of the first logic level of the first pulse signal is configured to increase as the drive voltage increases. The motor drive circuit also includes a second pulse generation circuit generating a second pulse signal having the first logic level and the second logic level. The duty ratio of the first logic level of the second pulse signal is different from the duty ratio of the first pulse signal. The motor drive circuit further includes a drive control circuit supplying a drive current to a coil of the motor at the duty ratio of the second pulse signal so as to start a rotation of the motor that is not rotating and supplying a drive current to the coil at the duty ratio of the first pulse signal after a predetermined time from the start of the rotation of the motor in response to a rotation signal corresponding to the rotation of the motor.

DETAILED DESCRIPTION OF THE INVENTION

Figure 1:
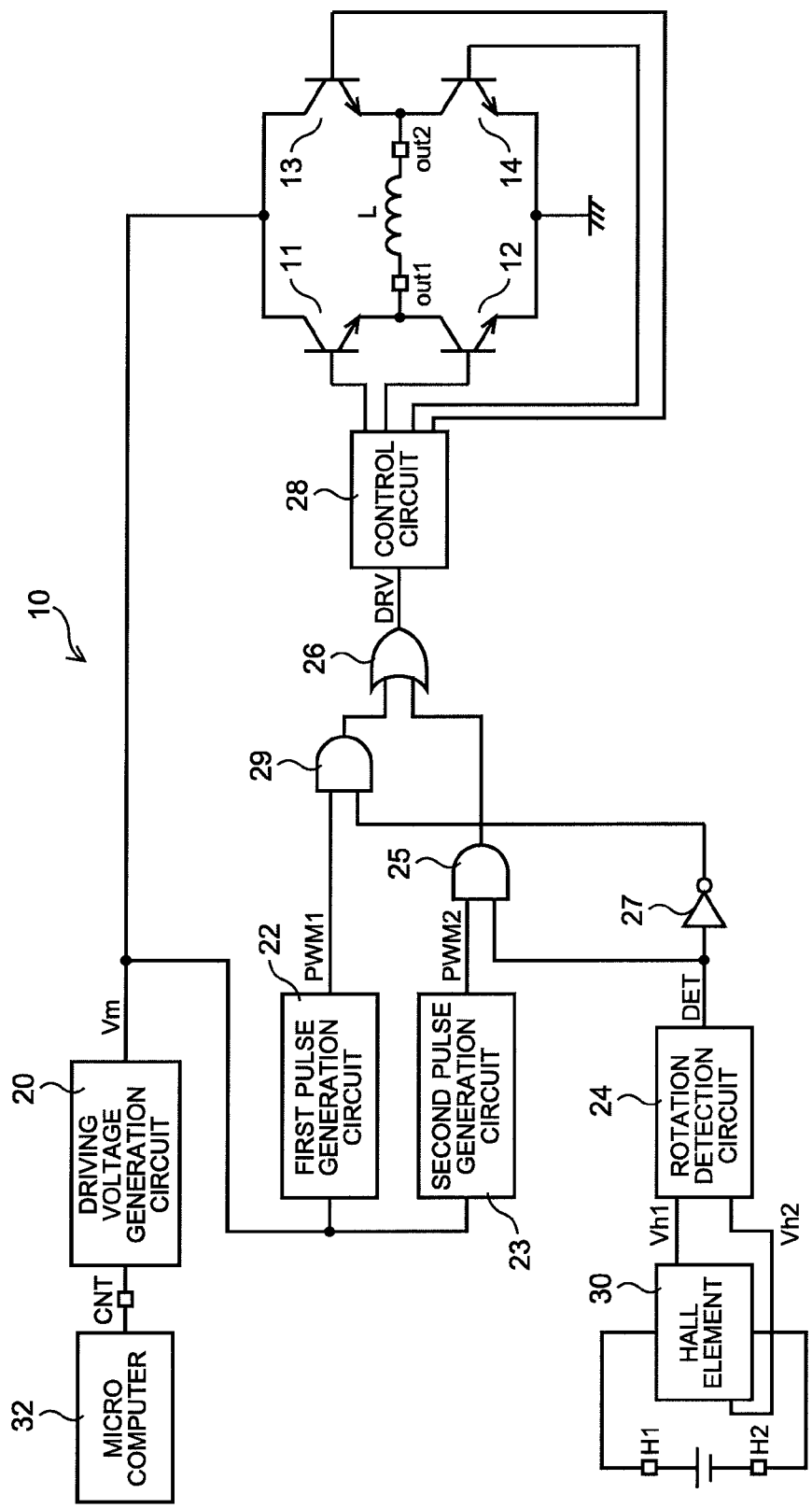
FIG. 1 is a diagram showing a structure of a motor drive circuit of an embodiment of the invention.

FIG. 1 is a diagram showing a structure of a motor drive circuit of an embodiment of the invention. A motor drive circuit 10 is built in a fan motor for cooling a heat generating component (a device to be cooled) in a personal computer or home electronics, and used to drive a motor for rotating a cooling fan.

The motor drive circuit 10 of the embodiment includes NPN transistors 11 to 14, a drive voltage generation circuit 20, a first pulse generation circuit 22, a second pulse generation circuit 23, a rotation detection circuit 24, a first AND circuit 25, a NOT circuit 27, a second AND circuit 29, a OR circuit 26 and a control circuit 28. In the embodiment, the motor drive circuit 10 is an integrated circuit, in which a motor coil L is connected between terminals OUT1, OUT2, a hall element 30 outputting a voltage Vh1 and a voltage Vh2 (rotation signals) corresponding to the rotating position of the motor is connected between terminals H1, H2, and a signal for controlling the rotation speed of the motor is inputted from a microcomputer 32 through a terminal CNT. The voltages Vh1, Vh2 change in sinusoidal waveforms of opposite phases to each other.

The NPN transistors 11 to 14 form an H bridge circuit for driving the motor coil L by a drive voltage Vm. For example, when the NPN transistors 11, 14 are in the on state and the NPN transistors 12, 13 are in the off state, the motor coil L is driven by the drive voltage Vm so that an electric current flows from the terminal OUT1 to the terminal OUT2. Furthermore, for example, when the NPN transistors 12, 13 are in the on state and the NPN transistors 11, 14 are in the off state, the motor coil L is driven by the drive voltage Vm so that an electric current flows from the terminal OUT2 to the terminal OUT1. When the motor drive circuit 10 is an integrated circuit, the NPN transistors 11 to 14 may be mounted on the outside of the integrated circuit 10.

The drive voltage generation circuit 20 generates the drive voltage Vm that increases as the target rotation speed increases corresponding to a signal indicating the target rotation speed inputted from the microcomputer 32. The drive voltage generation circuit 20 may be configured of a regulator circuit generating the drive voltage Vm by decreasing a supply voltage of, for example, 5.0 V corresponding to a signal from the microcomputer 32. The drive voltage Vm outputted by the drive voltage generation circuit 20 is used to drive the motor coil L as described above. Therefore, the rotation speed of the motor increases as the drive voltage Vm increases, and the rotation speed of the motor decreases as the drive voltage Vm decreases.

The first pulse generation circuit 22 generates a first pulse signal PWM1 of which the duty ratio (hereafter, referred to as a first duty ratio) of H level increases as the drive voltage Vm increases. In detail, the first pulse signal PWM1 periodically changes between H level and L level, and the first duty ratio is the ratio of the H level period to one cycle of the first pulse signal PWM1.

The first pulse signal PWM1 is to intermittently drive the motor coil L. In the case of the intermittent drive of the motor coil L corresponding to the first pulse signal PWM1, the motor coil L is driven during the H level period of the first pulse signal PWM1. The first pulse generation circuit 22 is realized by using, for example, a reference voltage generation circuit, a triangular wave generation circuit and a comparison circuit, such as the one disclosed in Japanese Patent Application Publication No. 2006-174648.

The second pulse generation circuit 23 generates a second pulse signal PWM2 of which the duty ratio of H level (hereafter, referred to as a second duty ratio) is constant without depending on the change of the drive voltage Vm. In detail, the second pulse signal PWM2 periodically changes between H level and L level, and the second duty ratio is the ratio of the H level period to one cycle of the second pulse signal PWM2.

The second pulse signal PWM2 is also to intermittently drive the motor coil L like the first pulse signal PWM1. In the case of the intermittent drive of the motor coil L corresponding to the second pulse signal PWM2, the motor coil L is driven during the H level period of the second pulse signal PWM2. At this time, if a start compensation function is prioritized, the second duty ratio is set larger than the first duty ratio. The following description is for the case where the second duty ratio is larger than the first duty ratio as an example, but the invention is not limited to this. For example, in a case where the value of the supply voltage Vm is large, or the like, a soft start function may be prioritized and thus the second duty ratio may be set smaller than the first duty ratio. The details of the second pulse generation circuit 23 will be described below.

The rotation detection circuit 24 detects based on the voltages Vh1, Vh2 outputted by the hall element 30 whether the motor is rotated, and outputs a detection signal DET (a rotation detection signal). In the embodiment, it is supposed that the detection signal DET becomes H level when the motor stops, and the detection signal DET becomes L level when the rotation of the motor is detected. Although the rotation of the motor is detected based on the voltages Vh1, Vh2 outputted by the hall element 30 in the embodiment, instead of the output of the hall element 30, the rotation of the motor may be detected by using a signal that changes corresponding to the rotation of the motor such as a FG (Frequency Generator) signal of which the frequency changes corresponding to the rotation speed of the motor.

The NOT circuit 27 inverts the detection signal DET outputted by the rotation detection circuit 24 and outputs it. Since the detection signal DET is H level during the stop of the motor until the detection of the rotation of the motor in the embodiment, the output of the NOT circuit 27 becomes L level. On the other hand, when the detection signal DET becomes L level by the detection of the rotation of the motor, the output of the NOT circuit 27 becomes H level.

The first AND circuit 29 outputs a logical multiplication of the first pulse signal PWM1 outputted by the first pulse generation circuit 22 and the output from the NOT circuit 27. Since the output of the NOT circuit is L level during the stop of the motor until the detection of the rotation of the motor in the embodiment, the output of the first AND circuit 29 is kept L level during that period without depending on the first pulse signal PWM1. When the rotation of the motor is detected and the output of the NOT circuit becomes H level, the output of the first AND circuit 29 becomes H level during the H level period of the first pulse signal PWM1.

The second AND circuit 25 outputs a logical multiplication of the second pulse signal PWM2 outputted by the second pulse generation circuit 23 and the detection signal DET outputted by the rotation detection circuit 24. Since the detection signal DET is H level during the stop of the motor until the detection of the rotation of the motor in the embodiment, the output of the second AND circuit 25 is also H level during the H level period of the second pulse signal PWM2. When the rotation of the motor is detected and the detection signal DET becomes L level, the output of the second AND circuit 25 is kept L level during that period without depending on the second pulse signal PWM2.

In detail, during the stop of the motor until the detection of the rotation of the motor, the output of the first AND circuit 29 is kept L level and the output of the second AND circuit 25 changes corresponding to the second pulse signal PWM2 outputted by the second pulse generation circuit 23. When the rotation of the motor is detected, the output of the second AND circuit 25 is kept L level and the output of the first AND circuit 29 changes corresponding to the first pulse signal PWM1 outputted by the first pulse generation circuit 22.

The OR circuit 26 outputs a logical sum of the output of the first AND circuit 29 and the output of the second AND circuit 25 as a drive signal DRV. In the embodiment, during the stop of the motor until the detection of the rotation of the motor, the drive signal DRV changes corresponding to the second pulse signal PWM2 outputted by the second pulse generation circuit 23. When the rotation of the motor is detected, the drive signal DRV changes corresponding to the first pulse signal PWM1 outputted by the first pulse generation circuit 22.

The control circuit 28 complementarily turns on or off the NPN transistors 11, 14 and the NPN transistors 12, 13 corresponding to the rotating position of the motor. Furthermore, the control circuit 28 appropriately turns on or off the NPN transistors 11 to 14 so that the motor coil L is driven by the drive voltage Vm during the H level period of the drive signal DRV. Therefore, during the stop of the motor until the detection of the rotation of the motor, the motor coil L is intermittently driven corresponding to the second duty ratio of the second pulse signal PWM2. When the rotation of the motor is detected, the motor coil L is intermittently driven corresponding to the first duty ratio of the first pulse signal PWM1.

Figure 2:
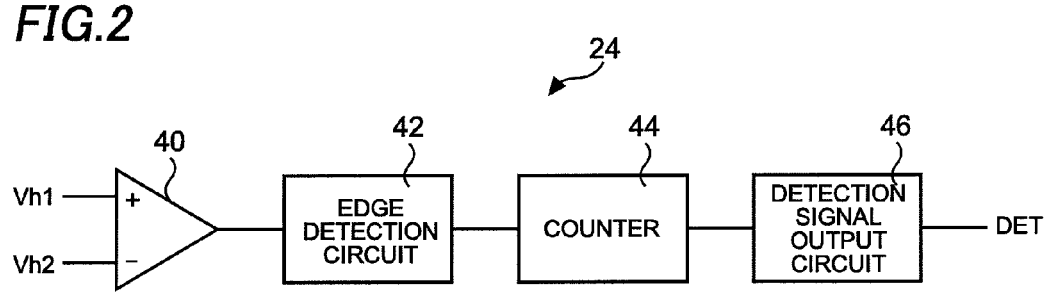
FIG. 2 is a diagram showing an example of a structure of a rotation detection circuit.

FIG. 2 is a diagram showing an example of the structure of the rotation detection circuit 24. The rotation detection circuit 24 includes a comparator 40, an edge detection circuit 42, a counter 44 and a detection signal output circuit 46. The comparator 40 outputs a result of comparing the voltages Vh1, Vh2. In the embodiment, the output of the comparator 40 is H level when the voltage Vh1 is larger than the voltage Vh2, and the output of the comparator 40 is L level when the voltage Vh1 is smaller than the voltage Vh2. The edge detection circuit 42 detects the edges of the signal outputted by the comparator 40, i.e., detects a change from L level to H level and a change from H level to L level, and outputs a pulse corresponding to the detection of the edge. The counter 44 counts the number of the pulses outputted by the edge detection circuit 42. The detection signal output circuit 46 changes the detection signal DET to L level when the count value of the counter reaches a predetermined value (e.g. "4"). During the stop of the motor, the count value of the counter 44 is reset to zero and the detection signal DET is reset to H level.

Figure 3:
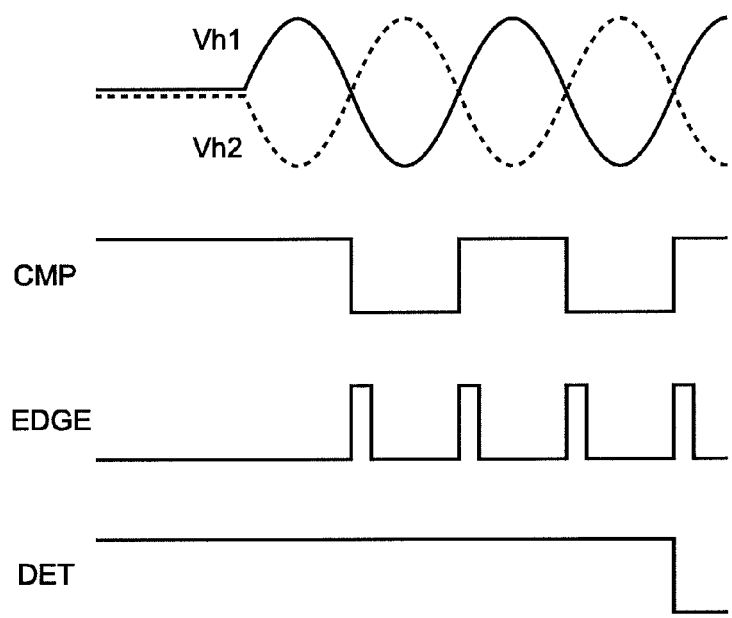
FIG. 3 is a diagram showing an example of operation of the rotation detection circuit.

An example of the operation of the motor drive circuit 10 for the start of the rotation of the motor that is stopping, i.e., not rotating, will be described. FIG. 3 is a diagram of an example of the operation of the rotation detection circuit 24. During the stop of the motor, the voltages Vh1, Vh2 outputted by the hall element 30 do not change and the signal CMP outputted by the comparator 40 does not also change. In the embodiment, the signal CMP outputted by the comparator 40 during the stop of the motor is H level.

When a signal indicating the target rotation speed of the motor is inputted by the microcomputer 32, the drive voltage generation circuit 20 generates the drive voltage Vm corresponding to the target rotation speed. Then the first pulse generation circuit 22 generates the first pulse signal PWM1 of which the first duty ratio changes corresponding to the change of the drive voltage Vm. On the other hand, the second pulse generation circuit 23 generates the second pulse signal PWM2 of which the second duty ratio is constant without depending on the change of the drive voltage Vm. During the stop of the motor, the count value of the counter 44 is reset to zero and the detection signal DET outputted by the detection signal output circuit 46 is reset to H level. Therefore, the drive signal DRV outputted by the OR circuit 26, i.e., the second pulse signal PWM2 has the second duty ratio, and the control circuit 28 starts the intermittent drive of the motor coil L corresponding to the second duty ratio. When the motor starts rotating by the intermittent drive corresponding to the second duty ratio, the voltages Vh1, Vh2 outputted by the hall element 30 change corresponding to the rotation of the motor and the signal CMP outputted by the comparator 40 also changes. By the change of the signal CMP, a signal EDGE is outputted by the edge detection circuit 42, and the count value of the counter 44 increases. When the count value of the counter 44 reaches a predetermined value (e.g. "4"), the motor is judged to start rotating and the detection signal DET outputted by the detection signal output circuit 46 changes to L level. When the detection signal DET becomes L level, the drive signal DRV outputted by the OR circuit 26, i.e., the first pulse signal PWM1 has the first duty ratio that changes corresponding to the change of the drive voltage Vm, and the motor coil L is intermittently driven corresponding to the first duty ratio. In other words, in the motor drive circuit 10, at the start of the rotation of the motor, the motor is intermittently driven corresponding to the constant second duty ratio without depending on the change of the drive voltage Vm. After a predetermined time from the start of the rotation of the motor, the motor is intermittently driven corresponding to the first duty ratio that corresponds to the change of the drive voltage Vm.

Figure 4:
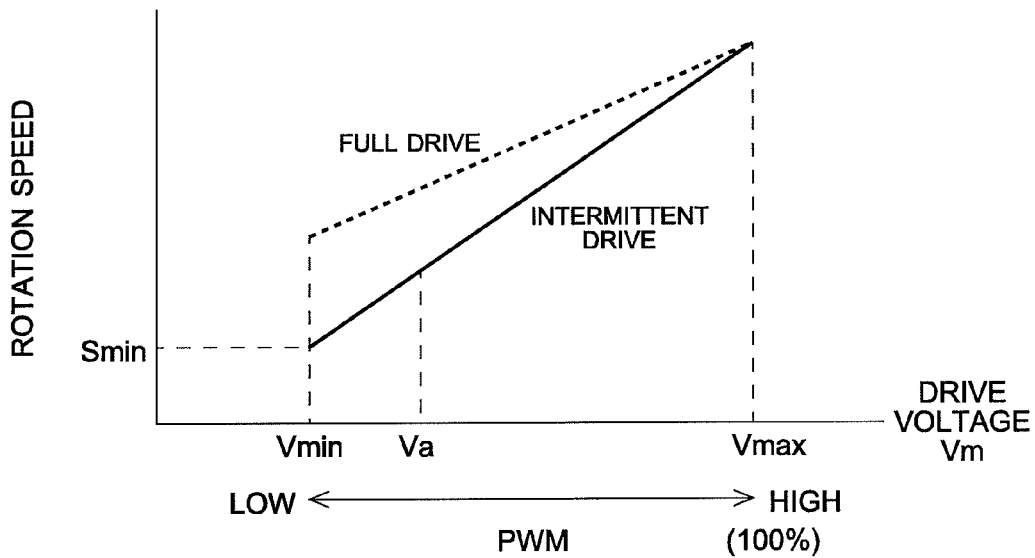
FIG. 4 is a graph showing an example of a relation of a drive voltage and a rotation speed of a motor.

FIG. 4 is a diagram showing an example of the relation of the drive voltage Vm and the rotation speed of the motor. As shown in FIG. 4, the rotation speed increases as the drive voltage Vm increases, and the rotation speed decreases as the drive voltage Vm decreases. Furthermore, since the H level duty ratio of the first pulse signal PWM1 increases as the drive voltage Vm increases, within the same range of changes of the drive voltage Vm, the lower rotation speed is achieved by the intermittent drive than by full drive. It is noted that the maximum rotation speed of the intermittent drive is equivalent to that of the full drive by setting the H level duty ratio of the pulse signal PWM when the drive voltage Vm is at the maximum level (Vmax) to 100%, and thus the cooling performance is kept.

During the rotation of the motor, the rotation speed of the motor is decreased by decreasing the drive voltage Vm and the first duty ratio of the first pulse signal PWM1. Then when the drive voltage Vm reaches the minimum level (Vmin), the rotation speed of the motor reaches the lowest speed Smin. On the other hand, when the rotation of the motor is to start at rotation speed Smin when the motor is stopping, the start torque exceeding the cogging torque may not be obtained by setting the drive voltage Vm at Vmin and starting the intermittent drive corresponding to the first duty ratio of the first pulse signal PWM1. Even in this case, in the motor drive circuit 10 of the embodiment, when the motor is to start rotating at rotation speed Smin when the motor is stopping, at the start of the rotation the intermittent drive corresponds to the constant second duty ratio (in this case, larger than the first duty ratio) without depending on the change of the drive voltage Vm, and thus the start torque exceeding the cogging torque is achieved to start the rotation of the motor. After a predetermined period from the start of the rotation of the motor, the torque is not needed more than at the start of the rotation since the inertia works. Therefore, the motor drive circuit 10 changes from the intermittent drive corresponding to the second duty ratio to the intermittent drive corresponding to the first duty ratio, and thus the rotation speed is controlled to be Smin.

In this manner, the motor drive circuit 10 of the embodiment further has a start compensation function while it employs a control method with a wider speed variance range than in the conventional PAM control method. From the viewpoint of the start compensation function only, it seems that the circuit 10 may be configured so as to drive the motor by full torque during the stop of the motor until the start of the rotation of the motor instead of being provided with the second pulse generation circuit 23 intentionally. However, if the motor that is stopping is driven suddenly by full torque, an electric current rushes in the motor coil L, exceeding the rating of the motor drive circuit. In this respect, the motor drive circuit 10 of the embodiment has the second pulse generation circuit 23 to control the second duty ratio, and thus achieves a soft start control while securing the start compensation function.

Figure 5:
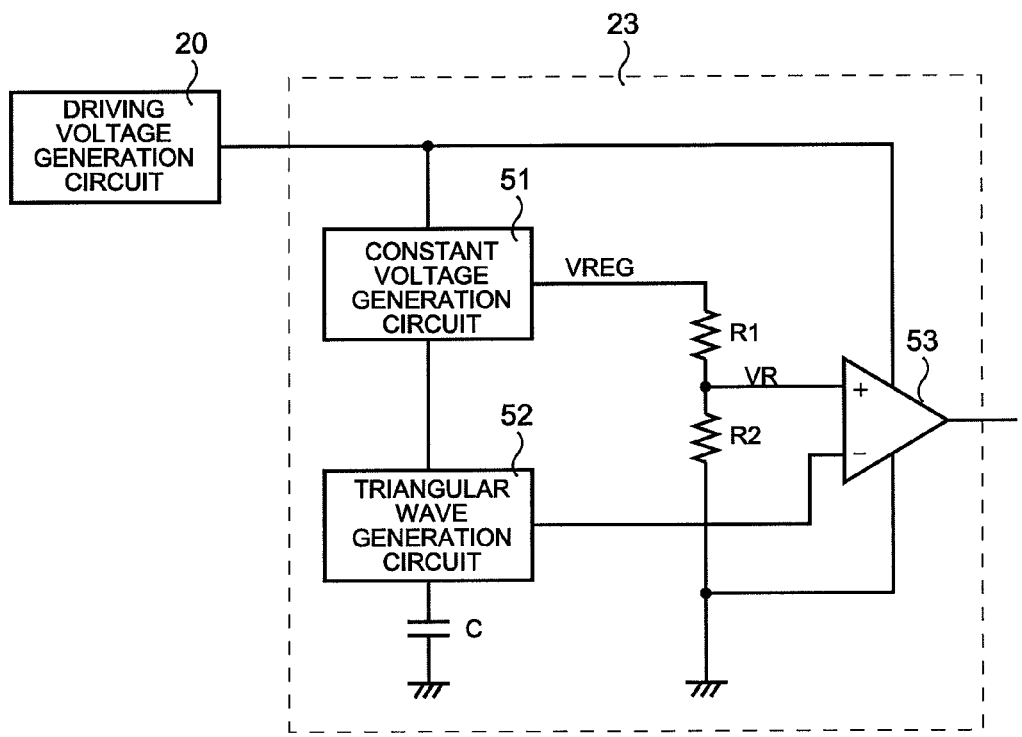
FIG. 5 is a diagram showing an example of a structure of a second pulse generation circuit.

FIG. 5 shows an example of the second pulse generation circuit 23. The second pulse generation circuit 23 includes a constant voltage generation circuit 51, a triangular wave generation circuit 52, resistors R1, R2 and a comparator 53. The constant voltage generation circuit 51 generates a constant reference voltage VREG in response to the drive voltage Vm generated by the drive voltage generation circuit 20. It is noted that the reference voltage VREG may be generated from other power source except the drive voltage generation circuit 20. The triangular wave generation circuit 52 generates a triangular wave by alternately charging and discharging a capacitor C. This triangular wave has a constant voltage amplitude without depending on the drive voltage Vm since it is generated by using the reference voltage VREG. In the comparator 53, a divided voltage VR that is obtained by dividing the reference voltage VREG by the resistors R1, R2 is inputted to a non-inversion input terminal (+), and the triangular wave is inputted to an inversion input terminal (−). The comparator 53 compares the divided voltage VR and the voltage of the triangular wave, and outputs the second pulse signal PWM2 that becomes H level during the period when the voltage of the triangular wave is larger than the divided voltage VR and becomes L level during the period when the divided voltage VR is larger than the voltage of the triangular wave. In this structure, for example, the soft start function is enhanced by adjusting the resistance dividing ratio of the resistors R1, R2 so that the divided voltage VR increases, and the start compensation function is enhanced by adjusting the resistance dividing ratio of the resistors R1, R2 so that the divided voltage VR decreases. As described above, by appropriately adjusting the resistance dividing ratio, the motor drive circuit 10 having both the start compensation function and soft start function is realized. Since the reference voltage VREG and the triangular wave are constant without depending on the change of the supply voltage Vm, the second duty ratio of the second pulse signal PWM2 is constant without depending on the change of the supply voltage Vm.

The motor drive circuit 10 of the embodiment is described as above. In order to start the rotation of the motor that is stopping, the motor is intermittently driven corresponding to the constant second duty ratio without depending on the change of the drive voltage Vm. After a predetermined time from the start of the rotation of the motor, the motor is intermittently driven corresponding to the first duty ratio corresponding to the change of the supply voltage Vm. Therefore, compared with a case where the motor is driven only during the H level period of the first pulse control signal PWM1 as the PWM signal, the lower speed start of the motor is realized while securing the start compensation function and soft start function.

With this motor drive circuit 10, when the amount of heat generation of a heat generating component in electronics is small, the rotation speed of a fan is decreased enough and the power consumption is minimized.

The described embodiment is provided for easy understanding of the invention, and should not be regarded as limiting the invention. Modification and change of the invention are possible within the scope of the invention and equivalents are included. For example, although the motor drive circuit 10 is to drive a single-phase fan motor in the embodiment, the motor to be driven is not limited to a fan motor and the number of phases is not limited to one. Both a low speed start (start compensation) function and a soft start function of a motor are achieved.

What is claimed is:
1. A motor drive circuit comprising:
a drive voltage generation circuit generating a drive voltage corresponding to a target rotation speed of a motor, the driving voltage being continuous between a predetermined minimum voltage and a predetermined maximum voltage;
a first pulse generation circuit generating a first pulse signal having a first logic level and a second logic level, a duty ratio of the first logic level of the first pulse signal continuously increasing as the drive voltage increases;
a second pulse generation circuit generating a second pulse signal having the first logic level and the second logic level, a duty ratio of the first logic level of the second pulse signal being different from the duty ratio of the first pulse signal; and
a drive control circuit supplying a drive current to a coil of the motor at the duty ratio of the second pulse signal so as to start a rotation of the motor that is not rotating and supplying a drive current to the coil at the duty ratio of the first pulse signal after a predetermined time from the start of the rotation of the motor in response to a rotation signal corresponding to the rotation of the motor,
wherein the first and second pulse generation circuits are connected between the drive voltage generation circuit and the drive control circuit so that the first and second pulse generation circuits receive the drive voltage generated by the drive voltage generation circuit.

2. The motor drive circuit of claim 1, wherein the duty ratio of the second pulse signal is constant without depending on a change of the drive voltage.

3. The motor drive circuit of claim 2, wherein the second pulse generation circuit comprises a constant voltage generation circuit generating a constant reference voltage in response to the drive voltage, a triangular wave generation circuit generating a triangular wave by using the reference voltage, a resistance division circuit generating a divided voltage that is obtained by dividing the reference voltage by resistors, and a comparator comparing the divided voltage and the triangular wave voltage, the second pulse generation circuit outputting an output of the comparator as the second pulse signal.

4. The motor drive circuit of claim 1, wherein the duty ratio of the second pulse signal is larger than the duty ratio of the first pulse signal.

* * * * *